United States Patent
Addanki et al.

(10) Patent No.: US 10,044,568 B2
(45) Date of Patent: *Aug. 7, 2018

(54) NETWORK EXTENSION GROUPS OF GLOBAL VLANS IN A FABRIC SWITCH

(71) Applicant: BROCADE COMMUNICATIONS SYSTEMS, INC., San Jose, CA (US)

(72) Inventors: Venkata R. K. Addanki, Cupertino, CA (US); Mythilikanth Raman, San Jose, CA (US); Phanidhar Koganti, Fremont, CA (US); Shunjia Yu, San Jose, CA (US); Suresh Vobbilisetty, San Jose, CA (US)

(73) Assignee: BROCADE COMMUNICATIONS SYSTEMS LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,159

(22) Filed: Sep. 28, 2017

(65) Prior Publication Data
US 2018/0019927 A1 Jan. 18, 2018

Related U.S. Application Data

(63) Continuation of application No. 14/704,660, filed on May 5, 2015, now Pat. No. 9,800,471.
(Continued)

(51) Int. Cl.
*H04L 12/46* (2006.01)
*H04L 12/24* (2006.01)
*H04L 29/06* (2006.01)

(52) U.S. Cl.
CPC ............. *H04L 41/12* (2013.01); *H04L 12/46* (2013.01); *H04L 12/4633* (2013.01);
(Continued)

(58) Field of Classification Search
CPC .................... H04L 12/4641–12/4695
See application file for complete search history.

(56) References Cited

U.S. PATENT DOCUMENTS

| | | | |
|---|---|---|---|
| 829,529 | A | 8/1906 | Keathley |
| 5,390,173 | A | 2/1995 | Spinney |

(Continued)

FOREIGN PATENT DOCUMENTS

| | | |
|---|---|---|
| CN | 1735062 | 2/2006 |
| CN | 1777149 | 5/2006 |

(Continued)

OTHER PUBLICATIONS

Eastlake, D. et al., 'RBridges: TRILL Header Options', Dec. 24, 2009, pp. 1-17, TRILL Working Group.
(Continued)

*Primary Examiner* — Hoon J Chung
(74) *Attorney, Agent, or Firm* — Shun Yao; Park, Vaughan, Fleming & Dowler LLP

(57) ABSTRACT

One embodiment of the present invention provides a switch in a network of interconnected switches. The switch includes a network extension module, which maintains a mapping between a first virtual local area network (VLAN) identifier and a first global VLAN identifier of a network extension group. The network extension group is represented by a range of global VLAN identifiers for a tenant. A global VLAN identifier is persistent in a respective switch of the network and represents a virtual forwarding domain in the network. During operation, the network extension module includes the global VLAN identifier in a packet belonging to the first VLAN.

20 Claims, 9 Drawing Sheets

Related U.S. Application Data

(60) Provisional application No. 61/992,563, filed on May 13, 2014.

(52) U.S. Cl.
CPC ...... *H04L 12/4641* (2013.01); *H04L 12/4654* (2013.01); *H04L 12/4675* (2013.01); *H04L 69/22* (2013.01); *H05K 999/99* (2013.01)

(56) References Cited

U.S. PATENT DOCUMENTS

| | | | |
|---|---|---|---|
| 5,802,278 | A | 9/1998 | Isfeld |
| 5,878,232 | A | 3/1999 | Marimuthu |
| 5,879,173 | A | 3/1999 | Poplawski |
| 5,959,968 | A | 9/1999 | Chin |
| 5,973,278 | A | 10/1999 | Wehrill, III |
| 5,983,278 | A | 11/1999 | Chong |
| 5,995,262 | A | 11/1999 | Hirota |
| 6,041,042 | A | 3/2000 | Bussiere |
| 6,085,238 | A | 7/2000 | Yuasa |
| 6,092,062 | A | 7/2000 | Lohman |
| 6,104,696 | A | 8/2000 | Kadambi |
| 6,122,639 | A | 9/2000 | Babu |
| 6,185,214 | B1 | 2/2001 | Schwartz |
| 6,185,241 | B1 | 2/2001 | Sun |
| 6,295,527 | B1 | 9/2001 | McCormack |
| 6,331,983 | B1 | 12/2001 | Haggerty |
| 6,438,106 | B1 | 8/2002 | Pillar |
| 6,498,781 | B1 | 12/2002 | Bass |
| 6,542,266 | B1 | 4/2003 | Phillips |
| 6,553,029 | B1 | 4/2003 | Alexander |
| 6,571,355 | B1 | 5/2003 | Linnell |
| 6,583,902 | B1 | 6/2003 | Yuen |
| 6,633,761 | B1 | 10/2003 | Singhal |
| 6,636,963 | B1 | 10/2003 | Stein |
| 6,771,610 | B1 | 8/2004 | Seaman |
| 6,870,840 | B1 | 3/2005 | Hill |
| 6,873,602 | B1 | 3/2005 | Ambe |
| 6,920,503 | B1 | 7/2005 | Nanji |
| 6,937,576 | B1 | 8/2005 | DiBenedetto |
| 6,956,824 | B2 | 10/2005 | Mark |
| 6,957,269 | B2 | 10/2005 | Williams |
| 6,975,581 | B1 | 12/2005 | Medina |
| 6,975,864 | B2 | 12/2005 | Singhal |
| 7,016,352 | B1 | 3/2006 | Chow |
| 7,061,877 | B1 | 6/2006 | Gummalla |
| 7,062,177 | B1 | 6/2006 | Grivna |
| 7,097,308 | B2 | 8/2006 | Singhal |
| 7,173,934 | B2 | 2/2007 | Lapuh |
| 7,197,308 | B2 | 3/2007 | Singhal |
| 7,206,288 | B2 | 4/2007 | Cometto |
| 7,274,694 | B1 | 9/2007 | Cheng |
| 7,310,664 | B1 | 12/2007 | Merchant |
| 7,313,637 | B2 | 12/2007 | Tanaka |
| 7,315,545 | B1 | 1/2008 | Chowdhury et al. |
| 7,316,031 | B2 | 1/2008 | Griffith |
| 7,330,897 | B2 | 2/2008 | Baldwin |
| 7,380,025 | B1 | 5/2008 | Riggins |
| 7,397,768 | B1 | 7/2008 | Betker |
| 7,397,794 | B1 | 7/2008 | Lacroute |
| 7,430,164 | B2 | 9/2008 | Bare |
| 7,453,888 | B2 | 11/2008 | Zabihi |
| 7,477,894 | B1 | 1/2009 | Sinha |
| 7,480,258 | B1 | 1/2009 | Shuen |
| 7,508,757 | B2 | 3/2009 | Ge |
| 7,558,195 | B1 | 7/2009 | Kuo |
| 7,558,273 | B1 | 7/2009 | Grosser |
| 7,571,447 | B2 | 8/2009 | Ally |
| 7,599,901 | B2 | 10/2009 | Mital |
| 7,653,056 | B1 | 1/2010 | Dianes |
| 7,688,736 | B1 | 3/2010 | Walsh |
| 7,688,960 | B1 | 3/2010 | Aubuchon |
| 7,690,040 | B2 | 3/2010 | Frattura |
| 7,706,255 | B1 | 4/2010 | Kondrat et al. |
| 7,716,370 | B1 | 5/2010 | Devarapalli |
| 7,720,076 | B2 | 5/2010 | Dobbins |
| 7,729,296 | B1 | 6/2010 | Choudhary |
| 7,787,480 | B1 | 8/2010 | Mehta |
| 7,792,920 | B2 | 9/2010 | Istvan |
| 7,796,593 | B1 | 9/2010 | Ghosh |
| 7,801,021 | B1 | 9/2010 | Triantafillis |
| 7,808,992 | B2 | 10/2010 | Homchaudhuri |
| 7,836,332 | B2 | 11/2010 | Hara |
| 7,843,906 | B1 | 11/2010 | Chidambaram et al. |
| 7,843,907 | B1 | 11/2010 | Abou-Emara |
| 7,860,097 | B1 | 12/2010 | Lovett |
| 7,898,959 | B1 | 3/2011 | Arad |
| 7,912,091 | B1 | 3/2011 | Krishnan |
| 7,924,837 | B1 | 4/2011 | Shabtay |
| 7,937,438 | B1 | 5/2011 | Miller |
| 7,937,756 | B2 | 5/2011 | Kay |
| 7,945,941 | B2 | 5/2011 | Sinha |
| 7,949,638 | B1 | 5/2011 | Goodson |
| 7,957,386 | B1 | 6/2011 | Aggarwal |
| 8,018,938 | B1 | 9/2011 | Fromm |
| 8,027,354 | B1 | 9/2011 | Portolani |
| 8,054,832 | B1 | 11/2011 | Shukla |
| 8,068,442 | B1 | 11/2011 | Kompella |
| 8,078,704 | B2 | 12/2011 | Lee |
| 8,090,805 | B1 | 1/2012 | Chawla |
| 8,102,781 | B2 | 1/2012 | Smith |
| 8,116,307 | B1 | 2/2012 | Thesayi |
| 8,125,928 | B2 | 2/2012 | Mehta |
| 8,134,922 | B2 | 3/2012 | Elangovan |
| 8,155,150 | B1 | 4/2012 | Chung |
| 8,160,063 | B2 | 4/2012 | Maltz |
| 8,160,080 | B1 | 4/2012 | Arad |
| 8,170,038 | B2 | 5/2012 | Belanger |
| 8,175,107 | B1 | 5/2012 | Yalagandula |
| 8,095,774 | B1 | 6/2012 | Lambeth |
| 8,194,674 | B1 | 6/2012 | Pagel |
| 8,195,774 | B2 | 6/2012 | Lambeth |
| 8,204,061 | B1 | 6/2012 | Sane |
| 8,213,313 | B1 | 7/2012 | Doiron |
| 8,213,336 | B2 | 7/2012 | Smith |
| 8,230,069 | B2 | 7/2012 | Korupolu |
| 8,239,960 | B2 | 8/2012 | Frattura |
| 8,249,069 | B2 | 8/2012 | Raman |
| 8,270,401 | B1 | 9/2012 | Barnes |
| 8,295,291 | B1 | 10/2012 | Ramanathan |
| 8,295,921 | B2 | 10/2012 | Wang |
| 8,301,686 | B1 | 10/2012 | Appajodu |
| 8,339,994 | B2 | 12/2012 | Gnanasekaran |
| 8,351,352 | B1 | 1/2013 | Eastlake |
| 8,369,335 | B2 | 2/2013 | Jha |
| 8,369,347 | B2 | 2/2013 | Xiong |
| 8,392,496 | B2 | 3/2013 | Linden |
| 8,451,717 | B2 | 5/2013 | Venkataraman |
| 8,462,774 | B2 | 6/2013 | Page |
| 8,465,774 | B2 | 6/2013 | Page |
| 8,467,375 | B2 | 6/2013 | Blair |
| 8,520,595 | B2 | 8/2013 | Yadav |
| 8,553,710 | B1 | 10/2013 | White |
| 8,595,479 | B2 | 11/2013 | Radhakrishnan |
| 8,599,850 | B2 | 12/2013 | Ha |
| 8,599,864 | B2 | 12/2013 | Chung |
| 8,615,008 | B2 | 12/2013 | Natarajan |
| 8,619,788 | B1 | 12/2013 | Sankaran |
| 8,625,616 | B2 | 1/2014 | Vobbilisetty |
| 8,705,526 | B1 | 4/2014 | Hasan |
| 8,706,905 | B1 | 4/2014 | McGlaughlin |
| 8,717,895 | B2 | 5/2014 | Koponen |
| 8,724,456 | B1 | 5/2014 | Hong |
| 8,792,501 | B1 | 7/2014 | Rustagi |
| 8,798,045 | B1 | 8/2014 | Aybay |
| 8,798,055 | B1 | 8/2014 | An |
| 8,804,732 | B1 | 8/2014 | Hepting |
| 8,804,736 | B1 | 8/2014 | Drake |
| 8,806,031 | B1 | 8/2014 | Kondur |
| 8,826,385 | B2 | 9/2014 | Congdon |
| 8,918,631 | B1 | 12/2014 | Kumar |
| 8,937,865 | B1 | 1/2015 | Kumar |
| 8,948,181 | B2 | 2/2015 | Kapadia |

(56) References Cited

U.S. PATENT DOCUMENTS

| | | |
|---|---|---|
| 8,971,173 B1 | 3/2015 | Choudhury |
| 8,995,272 B2 | 3/2015 | Agarwal |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |
| 9,524,173 B2 | 12/2016 | Guntaka |
| 9,626,255 B2 | 4/2017 | Guntaka |
| 9,628,407 B2 | 4/2017 | Guntaka |
| 9,699,001 B2 * | 7/2017 | Addanki ............... H04L 12/465 |
| 9,800,471 B2 * | 10/2017 | Addanki ................. H04L 41/12 |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1 | 9/2002 | Tingley |
| 2002/0161867 A1 | 10/2002 | Cochran |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1 | 12/2005 | Suzuki |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0110068 A1 | 5/2007 | Sekiguchi |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1 | 8/2007 | Boyd |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2007/0297406 A1 | 12/2007 | Rooholamini |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |

(56) References Cited

U.S. PATENT DOCUMENTS

| | | |
|---|---|---|
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0228897 A1 | 9/2008 | Ko |
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1 | 11/2008 | Friskney |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | Halna DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1 | 8/2009 | Devireddy |
| 2009/0222879 A1 | 9/2009 | Kostal |
| 2009/0225752 A1 | 9/2009 | Mitsumori |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1 | 11/2010 | Raman |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085562 A1 | 4/2011 | Bao |
| 2011/0085563 A1 | 4/2011 | Kotha |
| 2011/0088011 A1 | 4/2011 | Ouali |
| 2011/0110266 A1 | 5/2011 | Li |

(56) References Cited

U.S. PATENT DOCUMENTS

| | | |
|---|---|---|
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | VanDerMerwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1 | 2/2012 | Humphries |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0003747 A1 | 1/2013 | Raman |
| 2013/0016606 A1 | 1/2013 | Cirkovic |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0121142 A1 | 5/2013 | Bai |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0194914 A1 | 8/2013 | Agarwal |
| 2013/0201992 A1 | 8/2013 | Masaki |
| 2013/0215754 A1 | 8/2013 | Tripathi |
| 2013/0219473 A1 | 8/2013 | Schaefer |
| 2013/0223221 A1 | 8/2013 | Xu |
| 2013/0223438 A1 | 8/2013 | Tripathi |
| 2013/0223449 A1 | 8/2013 | Koganti |
| 2013/0238802 A1 | 9/2013 | Sarikaya |
| 2013/0250947 A1 | 9/2013 | Zheng |
| 2013/0250951 A1 | 9/2013 | Koganti |
| 2013/0250958 A1 | 9/2013 | Watanabe |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha |
| 2013/0301642 A1 | 11/2013 | Radhakrishnan |
| 2013/0308492 A1 | 11/2013 | Baphna |
| 2013/0308641 A1 | 11/2013 | Ackley |
| 2013/0308647 A1 | 11/2013 | Rosset |
| 2013/0315125 A1 | 11/2013 | Ravishankar |

(56) References Cited

U.S. PATENT DOCUMENTS

| | | |
|---|---|---|
| 2013/0315246 A1 | 11/2013 | Zhang |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0019639 A1 | 1/2014 | Ueno |
| 2014/0025736 A1 | 1/2014 | Wang |
| 2014/0029412 A1 | 1/2014 | Janardhanan |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Sun |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0188996 A1 | 7/2014 | Lie |
| 2014/0192804 A1 | 7/2014 | Ghanwani |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269709 A1 | 9/2014 | Benny |
| 2014/0269720 A1 | 9/2014 | Srinivasan |
| 2014/0269733 A1 | 9/2014 | Venkatesh |
| 2014/0298091 A1 | 10/2014 | Carlen |
| 2014/0355477 A1 | 12/2014 | Velayudhan |
| 2014/0362854 A1 | 12/2014 | Addanki |
| 2014/0362859 A1 | 12/2014 | Addanki |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0103826 A1 | 4/2015 | Davis |
| 2015/0110111 A1 | 4/2015 | Song |
| 2015/0110487 A1 | 4/2015 | Fenkes |
| 2015/0117256 A1 | 4/2015 | Sabaa |
| 2015/0117454 A1 | 4/2015 | Koponen |
| 2015/0127618 A1 | 5/2015 | Alberti |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0188770 A1 | 7/2015 | Naiksatam |
| 2015/0195093 A1 | 7/2015 | Mahadevan |
| 2015/0222506 A1 | 8/2015 | Kizhakkiniyil |
| 2015/0248298 A1 | 9/2015 | Gavrilov |
| 2015/0263897 A1 | 9/2015 | Ganichev |
| 2015/0263899 A1 | 9/2015 | Tubaltsev |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0212040 A1 | 7/2016 | Bhagavathiperumal |
| 2016/0344640 A1 | 11/2016 | Soderlund |
| 2017/0012880 A1 | 1/2017 | Yang |
| 2017/0026197 A1 | 1/2017 | Venkatesh |
| 2017/0097841 A1 | 4/2017 | Chang |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 1916807 A2 | 4/2008 |
| EP | 2001167 A1 | 10/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Perlman, Radia et al., 'RBridge VLAN Mapping', TRILL Working Group, Dec. 4, 2009, pp. 1-12.

Touch, J. et al., 'Transparent Interconnection of Lots of Links (TRILL): Problem and Applicability Statement', May 2009, Network Working Group, pp. 1-17.

Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.

Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].

Office Action dated Jun. 18, 215, U.S. Appl. No. 13/098,490, filed May 2, 2011.

Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].

TRILL Working Group Internet-Draft Intended status: Proposed Standard RBridges: Base Protocol Specificaiton Mar. 3, 2010.

Office Action dated Jun. 16, 2015, U.S. Appl. No. 13/048,817, filed Mar. 15, 2011.

Knight P et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.

Office Action for U.S. Appl. No. 13/092,873, filed Apr. 22, 2011, dated Nov. 29, 2013.

Perlman, Radia et al., 'RBridges: Base Protocol Specification; Draft-ietf-trill-rbridge-protocol-16.txt', Mar. 3, 2010, pp. 1-117.

(56) References Cited

OTHER PUBLICATIONS

'An Introduction to Brocade VCS Fabric Technology', Brocade white paper, http://community.brocade.com/docs/DOC-2954, Dec. 3, 2012.
'RBridges: Base Protocol Specification', IETF Draft, Perlman et al., Jun. 26, 2009.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
U.S. Appl. No. 13/030,806 Office Action dated Dec. 3, 2012.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated Jun. 8, 2015, U.S. Appl. No. 14/178,042, filed Feb. 11, 2014.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jan. 10, 2014, U.S. Appl. No. 13/092,580, filed Apr. 22, 2011.
Office action dated Jun. 10, 2013, U.S. Appl. No. 13/092,580, filed Apr. 22, 2011.
Office action dated Jan. 16, 2014, U.S. Appl. No. 13/042,259, filed Mar. 7, 2011.
Office action dated Mar. 18, 2013, U.S. Appl. No. 13/042,259, filed Mar. 7, 2011.
Office action dated Jul. 31, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Aug. 14, 2014, U.S. Appl. No. 13/092,460, filed Apr. 22, 2011.
Office action dated Jan. 28, 2013, U.S. Appl. No. 13/092,701, filed Apr. 22, 2011.
Office Action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Oct. 2, 2014, for U.S. Appl. No. 13/092,752, filed Apr. 22, 2011.
Office Action dated Apr. 9, 2014, U.S. Appl. No. 13/092,752, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Jan. 6, 2014, U.S. Appl. No. 13/092,877, filed Apr. 22, 2011.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Jul. 7, 2014, for U.S. Appl. No. 13/044,326, filed Mar. 9, 2011.
Office action dated Oct. 2, 2013, U.S. Appl. No. 13/044,326, filed Mar. 9, 2011.
Office Action dated Dec. 19, 2014, for U.S. Appl. No. 13/044,326, filed Mar. 9, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated Dec. 2, 2013, U.S. Appl. No. 13/184,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Nov. 29, 2013, U.S. Appl. No. 13/092,873, filed Apr. 22, 2011.
Office action dated Jun. 19, 2013, U.S. Appl. No. 13/092,873, filed Apr. 22, 2011.
Office Action dated May 21, 2015, U.S. Appl. No. 13/288,822, filed Nov. 3, 2011.
Office action dated Jul. 18, 2013, U.S. Appl. No. 13/365,808, filed Feb. 3, 2012.
Office Action dated Mar. 6, 2014, U.S. Appl. No. 13/425,238, filed Mar. 20, 2012.
Office action dated Nov. 12, 2013, U.S. Appl. No. 13/312,903, filed Dec. 6, 2011.
Office action dated Jun. 13, 2013, U.S. Appl. No. 13/312,903, filed Dec. 6, 2011.
Office Action dated Jun. 18, 2014, U.S. Appl. No. 13/440,861, filed Apr. 5, 2012.
Office action dated Apr. 30, 2015, U.S. Appl. No. 13/351,513, filed Jan. 17, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Apr. 1, 2015 U.S. Appl. No. 13/656,438, filed Oct. 19, 2012.
Office Action dated Jun. 6, 2014, U.S. Appl. No. 13/669,357, filed Nov. 5, 2012.

(56) References Cited

OTHER PUBLICATIONS

Office Action dated Jun. 10, 2015, U.S. Appl. No. 13/890,150, filed May 8, 2013.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Brocade 'Brocade Unveils 'The Effortless Network'', http://newsroom.brocade.com/press-releases/brocade-unveils-the-effortless-network-nasdaq-brcd-0859535, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Kompella, Ed K. et al., 'Virtual Private LAN Service (VPLS) Using BGP for Auto-Discovery and Signaling' Jan. 2007.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Mahalingam "VXLAN: A Framework for Overlaying Virtualized Layer 2 Networks over Layer 3 Networks" Oct. 17, 2013 pp. 1-22, Sections 1, 4 and 4.1.
Mckeown, Nick et al. "OpenFlow: Enabling Innovation in Campus Networks", Mar. 14, 2008, www.openflow.org/documents/openflow-wp-latest.pdf.
Narten, T. et al., 'Problem Statement: Overlays for Network Virtualization d raft-na rten-n vo3-over l ay-problem-statement-01', Oct. 31, 2011.
Office Action for U.S. Appl. No. 13/030,688, filed Feb. 18, 2011, dated Jul. 17, 2014.
Office Action for U.S. Appl. No. 13/042,259, filed Mar. 7, 2011, from Jaroenchonwanit, Bunjob, dated Jan. 16, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,752, filed Apr. 22, 2011, from Park, Jung H., dated Jul. 18, 2013.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/365,993, filed Feb. 3, 2012, from Cho, Hong Sol., dated Jul. 23, 2013.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Feb. 23, 2015.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.

(56) References Cited

OTHER PUBLICATIONS

Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/044,301, filed Mar. 9, 2011, dated Jan. 29, 2015.
Office Action for U.S. Appl. No. 13/044,301, dated Mar. 9, 2011.
Office Action for U.S. Appl. No. 13/050,102, filed Mar. 17, 2011, dated Jan. 26, 2015.
Office Action for U.S. Appl. No. 13/087,239, filed Apr. 14, 2011 dated Dec. 5, 2012.
Office Action for U.S. Appl. No. 13/092,460, filed Apr. 22, 2011, dated Mar. 13, 2015.
Office Action for U.S. Appl. No. 13/092,752, filed Apr. 22, 2011, dated Feb. 27, 2015.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Office Action for U.S. Appl. No. 13/184,526, filed Jul. 16, 2011, dated Jan. 5, 2015.
Office Action for U.S. Appl. No. 13/184,526, filed Jul. 16, 2011, dated Dec. 2, 2013.
Office Action for U.S. Appl. No. 13/351,513, filed Jan. 17, 2012, dated Feb. 28, 2014.
Office Action for U.S. Appl. No. 13/365,808, filed Jul. 18, 2013, dated Jul. 18, 2013.
Office Action for U.S. Appl. No. 13/425,238, filed Mar. 20, 2012, dated Mar. 12, 2015.
Office Action for U.S. Appl. No. 13/533,843, filed Jun. 26, 2012, dated Oct. 21, 2013.
Office Action for U.S. Appl. No. 13/598,204, filed Aug. 29, 2012, dated Jan. 5, 2015.
Office Action for U.S. Appl. No. 13/598,204, filed Aug. 29, 2012, dated Feb. 20, 2014.
Office Action for U.S. Appl. No. 13/669,357, filed Nov. 5, 2012, dated Jan. 30, 2015.
Office Action for U.S. Appl. No. 13/786,328, filed Mar. 5, 2013, dated Mar. 13, 2015.
Office Action for U.S. Appl. No. 13/851,026, filed Mar. 26, 2013, dated Jan. 30, 2015.
Office Action for U.S. Appl. No. 14/577,785, filed Dec. 19, 2014, dated Apr. 13, 2015.
Office Action for U.S. Appl. No. 13/092,887, dated Jan. 6, 2014.
Perlman, Radia et al., 'Challenges and Opportunities in the Design of TRILL: a Routed layer 2 Technology', 2009.
Rosen, E. et al., "BGP/MPLS VPNs", Mar. 1999.
S. Nadas et al., 'Virtual Router Redundancy Protocol (VRRP) Version 3 for IPv4 and IPv6', Internet Engineering Task Force, Mar. 2010.
Siamak Azodolmolky et al. "Cloud computing networking: Challenges and opportunities for innovations", IEEE Communications Magazine, vol. 51, No. 7, Jul. 1, 2013.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.

(56) References Cited

OTHER PUBLICATIONS

Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No. 14/662,092, dated Mar. 29, 2017.
Office Action for U.S. Appl. No. 14/817,097, dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
Office Action for U.S. Appl. No. 14/510,913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action for U.S. Appl. No. 14/216,292, dated Oct. 6, 2017.
Office action dated Oct. 26, 2017, U.S. Appl. No. 14/817,097, filed Aug. 3, 2015.
Office Action dated Mar. 20, 2018, U.S. Appl. No. 14/867,865, filed Sep. 28, 2015.

* cited by examiner

NETWORK EXTENSION GROUPS OF GLOBAL VLANS IN A FABRIC SWITCH

RELATED APPLICATIONS

This application is a continuation application of application Ser. No. 14/704,660, titled "Network Extension Groups," by inventors Venkata R. K. Addanki, Mythilikanth Raman, Phanidhar Koganti, Shunjia Yu, and Suresh Vobbilisetty, filed on 5 May 2015, which claims the benefit of U.S. Provisional Application No. 61/992,563, titled "Virtual Fabric Extension Service," by inventors Venkata R. K. Addanki, Mythilikanth Raman, Phanidhar Koganti, Shunjia Yu, and Suresh Vobbilisetty, filed 13 May 2014, the disclosure of which is incorporated by reference herein.

The present disclosure is related to U.S. Pat. No. 8,867,552, titled "Virtual Cluster Switching," by inventors Suresh Vobbilisetty and Dilip Chatwani, issued 21 Oct. 2014, and to U.S. patent application Ser. No. 13/971,397, titled "Global VLANs for Fabric Switches," by inventors Suresh Vobbilisetty, Phanidhar Koganti, and Chi Lung Chong, filed 20 Aug. 2013, the disclosures of which are incorporated by reference herein.

BACKGROUND

Field

This disclosure relates to communication networks. More specifically, this disclosure relates to a system and method for virtualized network extension.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as network virtualization and multi-tenancy, to accommodate diverse network demands efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 and layer-3 (e.g., Ethernet and Internet Protocol (IP), respectively) switching technologies continue to evolve. IP facilitates routing and end-to-end data transfer in wide area networks (WANs) while providing safeguards for error-free communication. On the other hand, more routing-like functionalities are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As Internet traffic is becoming more diverse, network virtualization is becoming progressively more important as a value proposition for network architects. In addition, the evolution of virtual computing has make multi-tenancy attractive and, consequently, placed additional requirements on the network. For example, virtual servers are being allocated to a large number of tenants while a respective tenant operating multiple virtualized networks. It is often desirable that the network infrastructure can provide a large number virtualized network to support multi-tenancy and ensure network separation among the tenants.

While today's networks support many desirable features, some issues remain unsolved in efficiently facilitating virtualized networks across multiple networks.

SUMMARY

One embodiment of the present invention provides a switch in a network of interconnected switches. The switch includes a network extension module, which maintains a mapping between a first virtual local area network (VLAN) identifier and a first global VLAN identifier of a network extension group. The network extension group is represented by a range of global VLAN identifiers for a tenant. A global VLAN identifier is persistent in a respective switch of the network and represents a virtual forwarding domain in the network. During operation, the network extension module includes the global VLAN identifier in a packet belonging to the first VLAN.

In a variation on this embodiment, the mapping maps the first VLAN identifier to an internal identifier, and maps the internal identifier to the first global VLAN identifier. The internal identifier is internal and local to the switch, and is distinct from a VLAN identifier.

In a variation on this embodiment, the range is represented by: (i) a first and a second sets of bits in a continuous representation, and (ii) a tenant bit length indicating a number of bits dedicated to represent the tenant in the continuous representation.

In a variation on this embodiment, the switch is an edge switch. The first global VLAN identifier is then an edge global VLAN identifier of the network extension group. An edge global VLAN identifier corresponds to an individual VLAN of the tenant.

In a variation on this embodiment, the switch is an aggregate switch for one or more edge switches. The first global VLAN identifier is then an aggregate global VLAN identifier of the network extension group. The aggregate global VLAN identifier corresponds to a respective VLAN of the tenant.

In a further variation, the switch also includes an interface module, which maintains a network extension interface forwarding the packet comprising the first global VLAN identifier. The network extension interface couples a second network of interconnected switches.

In a further variation, the switch also includes a tunnel management module, which encapsulates the packet in a tunnel encapsulation header. The network extension interface is then a tunnel interface.

In a further variation, the network extension group is persistent in the second network and represents a virtual forwarding domain in the second network.

In a variation on this embodiment, the switch is an aggregate switch for one or more aggregate switches in remote networks of interconnected switches. The first global VLAN identifier is then an aggregate global VLAN identifier. The aggregate global VLAN identifier corresponds to a plurality of aggregate VLANs of the remote networks.

In a variation on this embodiment, the switch also includes a packet processor, which encapsulates the packet in an encapsulation header. The encapsulation header includes the first global VLAN identifier.

In a variation on this embodiment, the network is a switch group operating as a single Ethernet switch. A respective switch of the network is associated with a group identifier identifying the switch group.

BRIEF DESCRIPTION OF THE FIGURES

In the figures, like reference numerals refer to the same figure elements.

DETAILED DESCRIPTION

Figure 1A:
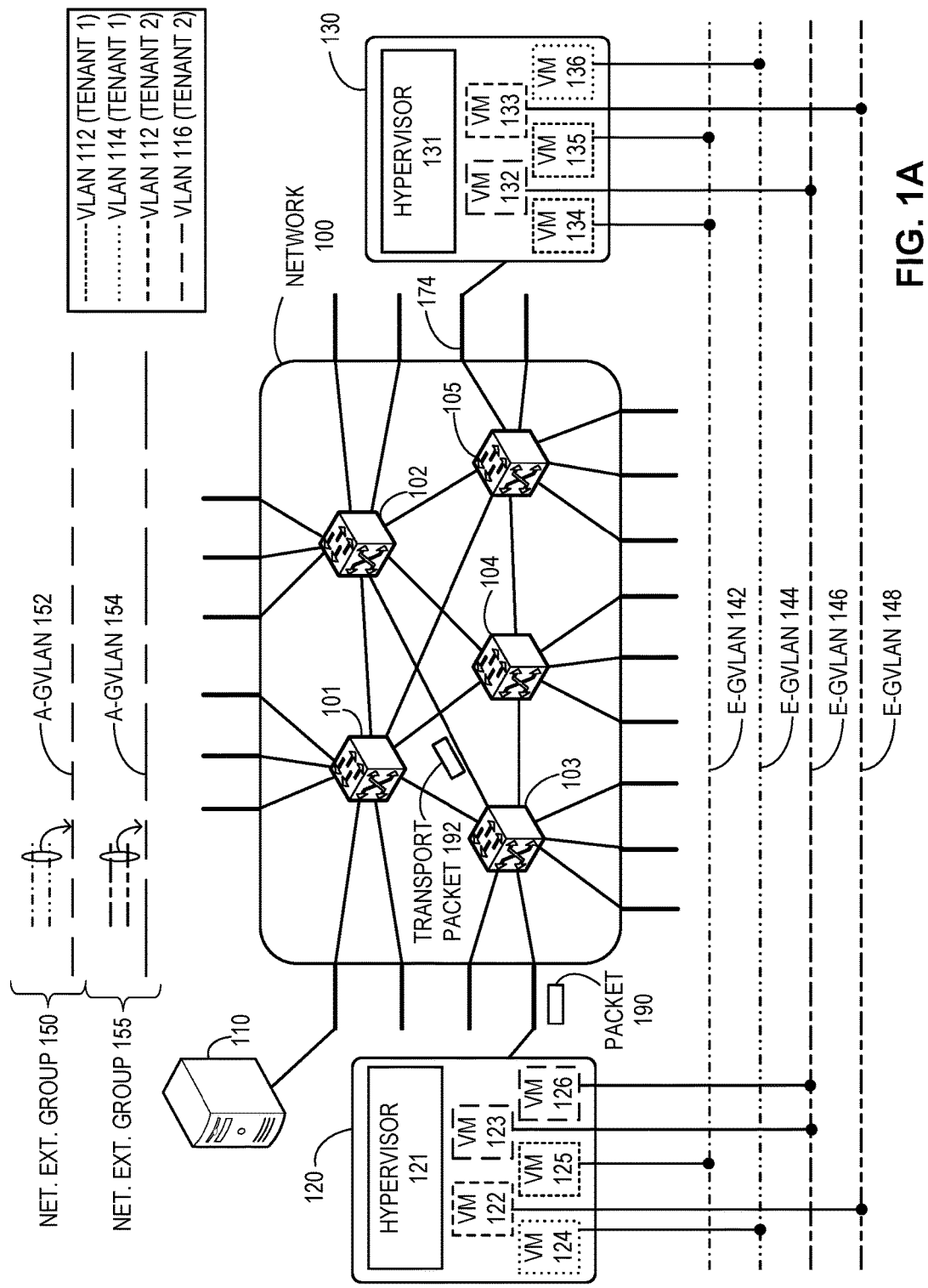
FIG. 1A illustrates an exemplary network with support for network extension groups, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating efficient network virtualization is solved by creating a network extension group consistent within a network and persistent across multiple networks. A network can include a number of interconnected member switches. Typically, a tenant (e.g., a client or customer) deploys a plurality of end devices (e.g., physical servers or virtual machines) belonging to different virtual local area networks (VLANs) (e.g., Institute of Electrical and Electronics Engineers (IEEE) 802.1Q VLANs). Since the network can serve a plurality of tenants, each deploying a number of VLANs, a respective member switch of the network can serve a plurality of tenants while a plurality of member switches can serve the same tenant. Furthermore, a tenant can deploy its end devices across different networks. As a result, a network requires a large number of VLANs which are consistent within the network and persistent across multiple networks.

With existing technologies, the total number of VLANs a network can support for a tenant is limited by the number of bits dedicated for a VLAN identifier. On the other hand, if a tenant does not need a large number of VLANs, the same number of bits, though unused, remains dedicated for that tenant. If an additional VLAN identifier is incorporated in a packet to identify a respective tenant in a network, the number of tenants is limited by the number of bits dedicated for the additional VLAN identifier.

To solve this problem, member switches in a network provides a network extension group for a respective tenant. The network extension group is consistent within a network and can be persistent across multiple networks. The network extension group includes a range of global VLANs. A global VLAN creates a virtual forwarding domain within the network. A respective switch can select a global VLAN from the range as an aggregate global VLAN and the rest can operate as edge global VLANs. In some embodiments, a respective global VLAN in a network extension group is represented using the combined bits dedicated for both tenant and additional VLAN identifiers in a flat representation. As a result, a global VLAN identifier can be represented using any number of bits in the combined bits for representing a tenant and using the rest of the bits for representing a respective VLAN for the tenant.

An edge switch of a network, which receives packets via a local edge port from a device of a tenant, maps tenant VLANs to corresponding edge global VLANs specified in the network extension group for the tenant. This mapping can be local to the edge switch. In other words, the same tenant VLAN can be mapped to different edge global VLANs in different edge switches. On the other hand, an aggregate switch, which does not couple a device of the tenant via a local edge port, maintains the aggregate global VLAN specified in the network extension group for all VLANs for that tenant. Since the aggregate switch uses less hardware resources to support fewer numbers of aggregate global VLANs, the network extension group provides scalability within the network and allows an aggregate switch to support multiple edge switches.

Furthermore, a network extension group can be persistent in multiple networks. An aggregate switch can include the aggregate global VLAN identifier in a packet sent via the interconnection between the networks. In this way, a persistent network extension group allows interconnectivity of networks without being limited by the tenant VLANs at the interconnection. This increases the number of VLANs a tenant may have in a network. The persistent network extension group also facilitates a better representation of a tenant in the network. For example, the network can support more tenants than the number of tenants supported by an additional VLAN identifier (e.g., an IEEE 802.1ad tag). This allows a provider to deploy multiple smaller networks to form a large network, thereby facilitating isolation of network management and fault detection within respective small networks.

In some embodiments, a global VLAN of a network extension group can support Internet Protocol (IP) routing. A global VLAN then can be associated with an IP subnetwork (subnet) and can operate as a logical layer-3 interface assigned with an IP address from the subnet in a respective aggregate switch. A respective aggregate switch can maintain a mapping between the global VLAN and the corresponding subnet. In some embodiments, the layer-3 interface operates as a default gateway for the corresponding global VLAN and is assigned a virtual IP address, which is consistent in a respective aggregate switch. Because the layer-3 interface is associated with the same virtual IP address in a respective aggregate switch, the layer-3 interface operates as a distributed layer-3 gateway, and can operate as a tunnel endpoint to forward traffic across network.

In some embodiments, the network is a fabric switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

It should also be noted that a fabric switch is distinct from a VLAN. A fabric switch can accommodate a plurality of VLANs. A VLAN is typically identified by a VLAN tag. In contrast, the fabric switch is identified a fabric identifier (e.g., a VCS identifier), which is assigned to the fabric switch. A respective member switch of the fabric switch is associated with the fabric identifier. Furthermore, when a member switch of a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared among a respective member switch of the fabric switch.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

Although the present disclosure is presented using examples based on an encapsulation protocol, embodiments of the present invention are not limited to networks defined using one particular encapsulation protocol associated with a particular Open System Interconnection Reference Model (OSI reference model) layer. For example, embodiments of the present invention can also be applied to a multi-protocol label switching (MPLS) network. In this disclosure, the term "encapsulation" is used in a generic sense, and can refer to encapsulation in any networking layer, sub-layer, or a combination of networking layers.

The term "end device" can refer to any device external to a network (e.g., does not perform forwarding in that network). Examples of an end device include, but are not limited to, a physical or virtual machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the network. An end device hosting one or more virtual machines can be referred to as a host machine. In this disclosure, the terms "end device" and "host machine" are used interchangeably.

The term "hypervisor" is used in a generic sense, and can refer to any virtual machine manager. Any software, firmware, or hardware that creates and runs virtual machines can be a "hypervisor." The term "virtual machine" also used in a generic sense and can refer to software implementation of a machine or device. Any virtual device which can execute a software program similar to a physical device can be a "virtual machine." A host external device on which a hypervisor runs one or more virtual machines can be referred to as a "host machine."

The term "VLAN" is used in a generic sense, and can refer to any virtualized network. Any virtualized network comprising a segment of physical networking devices, software network resources, and network functionality can be can be referred to as a "VLAN." "VLAN" should not be interpreted as limiting embodiments of the present invention to layer-2 networks. "VLAN" can be replaced by other terminologies referring to a virtualized network or network segment, such as "Virtual Private Network (VPN)," "Virtual Private LAN Service (VPLS)," or "Easy Virtual Network (EVN)."

The term "packet" refers to a group of bits that can be transported together across a network. "Packet" should not be interpreted as limiting embodiments of the present invention to layer-3 networks. "Packet" can be replaced by other terminologies referring to a group of bits, such as "frame," "cell," or "datagram."

The term "switch" is used in a generic sense, and can refer to any standalone or fabric switch operating in any network layer. "Switch" can be a physical device or software running on a computing device. "Switch" should not be interpreted as limiting embodiments of the present invention to layer-2 networks. Any device that can forward traffic to an external device or another switch can be referred to as a "switch." Examples of a "switch" include, but are not limited to, a layer-2 switch, a layer-3 router, a TRILL RBridge, or a fabric switch comprising a plurality of similar or heterogeneous smaller physical switches.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

The term "edge port" refers to a port on a network which exchanges data frames with a device outside of the network (i.e., an edge port is not used for exchanging data frames with another member switch of a network). The term "inter-switch port" refers to a port which sends/receives data frames among member switches of the network. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "tunnel" refers to a data communication where one or more networking protocols are encapsulated using another networking protocol. Although the present disclosure is presented using examples based on a layer-3 encapsulation of a layer-2 protocol, "tunnel" should not be interpreted as limiting embodiments of the present invention to layer-2 and layer-3 protocols. A "tunnel" can be established for and using any networking layer, sub-layer, or a combination of networking layers.

Network Architecture

FIG. 1A illustrates an exemplary network with support for network extension groups, in accordance with an embodiment of the present invention. As illustrated in FIG. 1A, a network 100 includes member switches 101, 102, 103, 104, and 105. Network 100 can be a TRILL network and a respective member switch, such as switch 105, can be a TRILL RBridge. Network 100 can also be an IP network and a respective member switch, such as switch 105, can be an IP-capable switch, which calculates and maintains a local IP routing table (e.g., a routing information base or RIB), and is capable of forwarding packets based on its IP addresses. In some embodiments, network 100 is a fabric switch, and one or more switches in fabric switch 100 can be virtual switches (e.g., a software switch running on a computing device).

Switches 103 and 105 are coupled to host machines 120 and 130, respectively. Member switches in network 100 use edge ports to communicate with end devices and inter-switch ports to communicate with other member switches. For example, switch 103 is coupled to end devices, such as host machine 120, via edge ports and to switches 101, 102, and 104 via inter-switch ports. Host machines 120 and 130 include hypervisors 121 and 131, respectively. Virtual machines (VMs) 122, 123, 124, 125, and 126 run on hypervisor 121, and virtual machines 132, 133, 134, 135, and 136 run on hypervisor 131.

In this example, virtual machines 124, 125, 134, 135, and 136 belong to a tenant 1 and virtual machines 122, 123, 126, 132, and 133 belong to a tenant 2. Tenant 1 deploys VLANs 112 and 114, and tenant 2 deploys VLANs 112 and 116. Hence, the same VLAN identifier can be used by multiple tenants. Virtual machines 125, 134, and 135 are in VLAN 112 of tenant 1, virtual machines 124 and 136 are in VLAN 114 of tenant 1, virtual machines 122 and 133 are in VLAN 112 of tenant 2, and virtual machines 123, 126, and 132 are in VLAN 116 of tenant 2. Since network 100 is serving a plurality of tenants, each deploying a plurality of VLANs, a respective member switch of network 100 can serve both tenants 1 and 2, and a plurality of member switches can serve the same tenant 1 or 2.

With existing technologies, the total number of VLANs network 100 can support for tenant 1 or 2 is limited by the number of bits dedicated for a VLAN identifier (e.g., 12 bits in an IEEE 802.1Q tag). On the other hand, if tenant 1 or 2 does not need a large number of VLANs, the same number of bits, though unused, remains dedicated for that tenant. If an additional VLAN identifier (e.g., an IEEE 802.1ad tag or TRILL Fine Grain Labels (FGL)) is incorporated in a packet to identify tenant 1 or 2 in network 100, the number of tenants is limited by the number of bits dedicated for the additional VLAN identifier (e.g., an additional 12 bits in the 802.1ad tag).

To solve this problem, a respective member switch in network 100 supports a network extension group for a respective tenant. For example, a respective member switch in network 100 supports network extension groups 150 and 155 for tenants 1 and 2, respectively. A respective of network extension groups 150 and 155 includes a range of global VLAN identifiers and are consistent within network 100. As a result, a global VLAN of a network extension group in a respective member switch of network 100 remains within the range. A member switch can select one global VLAN as an aggregate global VLAN and the rest as edge global VLANs. For example, network extension group 150 includes aggregate global VLAN 152 and edge global VLANs 142 and 144. Similarly, network extension group 155 includes aggregate global VLAN 154 and edge global VLANs 146 and 148.

In network 100, switches 103, 104, and 105 are edge switches since these switches receive packets via edge ports from tenant devices. An edge switch in network 100 maps a VLAN of a tenant (i.e., a tenant VLAN) to a corresponding edge global VLAN specified in the network extension group for that tenant. For example, switches 103 and 105 maintain a mapping between VLANs 112 and 114 of tenant 1, and edge global VLANs 142 and 144, respectively, of network extension group 150. Here, the mapping is maintained using VLAN identifiers and their corresponding global VLAN identifiers. Switches 103 and 105 also maintain a mapping between VLANs 112 and 116 of tenant 2, and edge global VLANs 146 and 148, respectively, of network extension group 155. In this example, switch 103 determines that, since they belong to different tenants, virtual machines 122 and 125 are in different layer-2 domains even though they are configured with the same tenant VLAN identifier. As a result, switch 103 associates virtual machines 122 and 125 to global VLANs 148 and 142, respectively.

In some embodiments, the mapping between a tenant VLAN and a global VLAN can be local to a switch. For example, switch 103 can maintain a mapping between VLANs 112 and 116 of tenant 2, and edge global VLANs 146 and 148, respectively, of network extension group 155. On the other hand, another edge switch 105 can maintain a mapping between VLANs 112 and 116 of tenant 2, and edge global VLANs 148 and 146, respectively. However, a respective global VLAN identifier in switches 103 and 105 remains within the range of global VLAN identifiers associated with network extension group 155.

In network 100, switches 101 and 102 are aggregate switches for tenants 1 and 2 since switch 101 and 102 do not couple a device of tenants 1 and 2 via a local edge port. However, because switch 101 couples end device 110 of another tenant, switch 101 can be an edge switch for that tenant. An aggregate switch in network 100 maps an aggregate global VLAN specified in a network extension group for all VLANs of the corresponding tenant. For example, switch 101 maintains a mapping between tenant information of tenant 1, and aggregate global VLAN 152 of network extension group 150. Here, the mapping may be maintained without using a tenant VLAN identifier.

Since switch 101 does not forward packets to individual devices of tenant 1, switch 101 does not need to enforce VLAN separation to the traffic from tenant 1. As a result, packets belonging to a respective VLAN of tenant 1 can be mapped to the same aggregate global VLAN in switch 101. In some embodiments, another aggregate switch 102 can map tenant information of tenant 1 to another aggregate global VLAN if it is within the range of network extension group 150 (i.e., the VLAN identifier of the aggregate global VLAN is within the range of network extension group 150).

In some embodiments, switches in network 100 receive the mappings from a network manager. End device 110 can operate as a network manager. Examples of a network manager include, but are not limited to, VMWare vCenter, Citrix XenCenter, and Microsoft Virtual Machine Manager. A network administrator can configure the mapping from end device 110, which in turn, provides the mapping to switch 101. Switch 101 distributes the mapping to the corresponding member switch based on an internal information distribution service of network 100. Suppose that the network manager configures a mapping between tenant information of tenant 1 and aggregate global VLAN 152 for switch 102 from end device 110. Switch 101 receives the mapping and provides the mapping to switch 102.

In some embodiments, a packet forwarded via an inter-switch link in network 100 is encapsulated in an encapsulation header. The encapsulation header can be a fabric encapsulation header (e.g., an encapsulation header used to forward the packet in a fabric switch) or a tunnel header (e.g., an encapsulation header used to forward the packet via a tunnel). Examples of a fabric encapsulation header include, but are not limited to, a TRILL header, an IP header, an Ethernet header, and a combination thereof. Examples of a tunnel include, but are not limited to, Virtual Extensible Local Area Network (VXLAN), Generic Routing Encapsulation (GRE), and its variations, such as Network Virtualization using GRE (NVGRE) and openvSwitch GRE. The VLAN identifier of a global VLAN can be included in the encapsulation header.

During operation, virtual machine 125 sends a packet 190. Hypervisor 121 obtains packet 190 and sends it to switch 103. Upon receiving packet 190 via an edge port, switch 103 identifies that packet 190 belongs to VLAN 112 of tenant 1. Based on the local mapping, switch 103 determines that VLAN 112 of tenant 1 is mapped to edge global VLAN 142. Switch 103 encapsulates packet 190 in an encapsulate header to generate a transport packet 192. A packet used to transport traffic between an edge switch and an aggregate switch in a network can be referred to as a transport packet. Switch 103 includes the VLAN identifier of edge global VLAN 142 in the encapsulation header of packet 192 and forwards packet 192 to aggregate switch 102. Upon receiving packet 192, switch 102 processes packet 192 based on its header information.

In some embodiments, a respective member switch of network 100 (e.g., switch 103) runs a control plane with automatic configuration capabilities based on Fibre Channel (FC) protocol and forms a logical Ethernet switch based on the automatic configuration capabilities of the control plane. To an external end device, such as host machine 120, network 100 can appear as one, single Ethernet switch. Upon joining network 100 via the control plane, a respective member switch receives an automatically assigned identifier corresponding to the logical Ethernet switch. However, unlike an FC fabric, the data packets in network 100 can be encapsulated and forwarded based on another forwarding protocol. Examples of this forwarding protocol include, but are not limited to, Ethernet, TRILL, and IP. Furthermore, a respective member switch of network 100 can be associated with a group identifier, which identifies network 100 as a group of interconnected switches. If network 100 is a fabric switch, this group identifier can be a fabric identifier identifying the fabric switch.

In some embodiments, network 100 maintains a port profile for a respective virtual machine. A port profile represents Fibre Channel over Ethernet (FCoE) configuration, VLAN configuration, data center bridging (DCB) configuration, quality of service (QoS) configuration, and/or security configuration of one or more virtual machines. The MAC address of a virtual machine associates with the corresponding port profile to the virtual machine. The VLAN configuration in a port profile can indicate the global VLAN configuration for the virtual machine. Port profile management in a switch is specified in U.S. Patent Publication No. 2011/0299413, titled "Port profile management for virtual cluster switching," the disclosure of which is incorporated herein in its entirety.

Figure 1B:
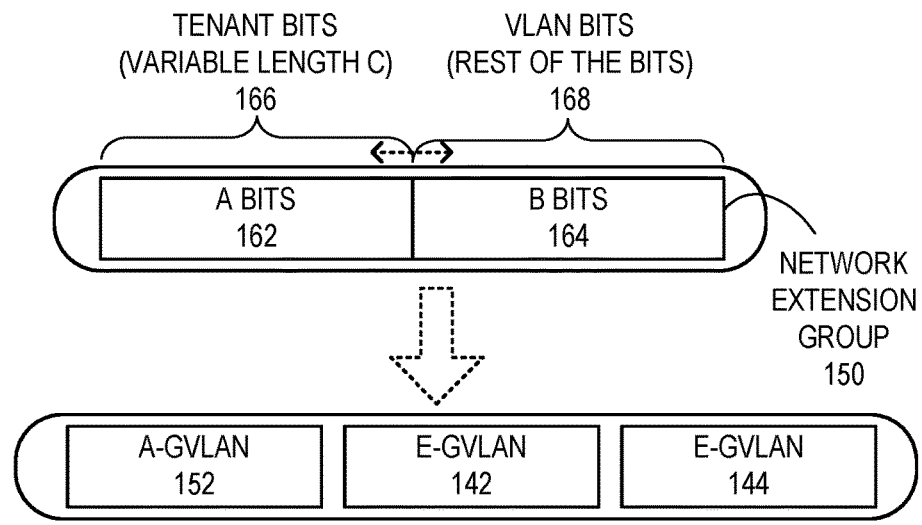
FIG. 1B illustrates an exemplary network extension group, in accordance with an embodiment of the present invention.

A respective member switch, such as switch 103, locally maintains network extension group to facilitate its fabric-wide deployment. FIG. 1B illustrates an exemplary network extension group, in accordance with an embodiment of the present invention. In some embodiments, a respective global VLAN in a network extension group is represented using the combined bits dedicated for both tenant and additional VLAN identifiers in a flat (e.g., a continuous and non-hierarchical) representation. Suppose that a tenant VLAN identifier is represented by A bits 162 and an additional VLAN identifier is represented by B bits 164. In some embodiments, a respective global VLAN in network extension group 150 is identified by a global VLAN identifier represented by the combined bits 162 and 164 of A.B (e.g., a concatenation) in a flat representation.

Starting from the most significant bit (MSB), any number of bits in A.B can be used to represent tenant 1. These bits can be referred to as tenant bits 166. The length of tenant bits 166 can be variable (denoted with a dotted arrow). For example, tenant bits 166 can include a subset of continuous bits in A from the MSB, or all bits of A and a subset of adjacent bits in B. Rest of the bits of A.B can be used to distinctly represent a respective global VLAN for tenant 1. These bits can be referred to as VLAN bits 168. If the length of tenant bits 166 is C, the global VLAN identifiers of network extension group 150 can be represented as A.B/C. Hence, aggregate global VLAN 152, and edge global VLANs 142 and 144 correspond to A.B/C. In this way, a respective switch in network 150 is aware of the bits dedicated as tenant bits 166 and can independently assign global VLAN identifiers corresponding to A.B/C.

For example, if the length of A and B is 12 bits each (e.g., IEEE 802.1ad tag or TRILL FGL), and A.B/C is 4.8./21, the most significant 21 bits of 000000000100.000000001<u>000</u> is assigned as tenant bits 166 and the rest 3 bits (underlined bits) are assigned as VLAN bits 168. As a result, network extension group 150 facilitates 8 VLANs for tenant 1 in network 100 (e.g., global VLAN identifiers between 4.8 and 4.15) using VLAN bits 168. It should be noted that any number of bits, starting from the least significant bit (LSB), in A.B can also be used to represent a tenant or a VLAN, and rest of the bits can be used to represent a VLAN or tenant, respectively.

Figure 1C:
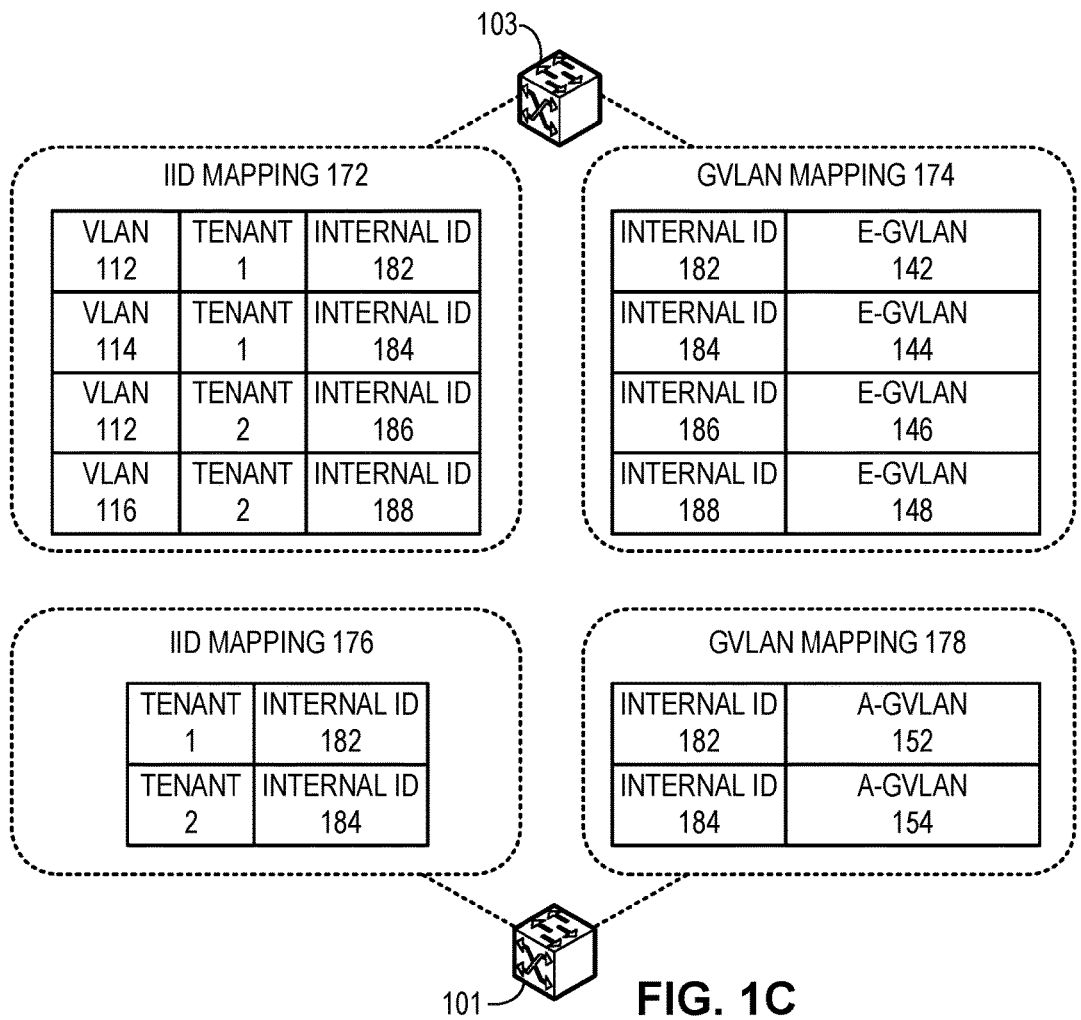
FIG. 1C illustrates exemplary mappings for supporting network extension groups, in accordance with an embodiment of the present invention.

FIG. 1C illustrates exemplary mappings for supporting network extension groups, in accordance with an embodiment of the present invention. In this example, edge switch 103 maintains an internal identifier 172 (e.g., in a table, which can be a database table in a local persistent storage). An entry in mapping 172 maps one or more fields of a packet header to an internal identifier. This internal identifier is internal and local to switch 103, and not included in a packet in network 100. Mapping 172 maps VLANs 112 and 114 of tenant 1, and corresponding tenant information, to internal identifiers 182 and 184, respectively, and VLANs 112 and 116 of tenant 2, and corresponding tenant information, to internal identifiers 186 and 186, respectively. Examples of the tenant information include, but are not limited to, a tenant identifier, an IP subnet, a source MAC address, an ingress port, and a combination thereof.

Switch 103 also includes a global VLAN mapping 174. An entry in mapping 174 maps an internal identifier to a corresponding global VLAN. Mapping 174 maps internal identifiers 182 and 184 to edge global VLANs 142 and 144, respectively, and internal identifiers 186 and 188 to edge global VLANs 146 and 148, respectively. In some embodiments, internal identifiers 182, 184, 186, and 188 in switch 103 are mapped to one or more corresponding egress ports. If the header information of an ingress packet matches an internal identifier, switch 103 forwards that packet via the corresponding egress port.

On the other hand, aggregate switch 101 maintains an internal identifier mapping 176. An entry in mapping 176 maps one or more fields of a packet header to an internal identifier. Mapping 176 maps tenant information of tenant 1, regardless of any VLAN association, to an internal identifier 182. Similarly, mapping 176 maps tenant information of tenant 2, regardless of any VLAN association, to an internal identifier 184. In this way, the same internal identifier 182 can be mapped to different packet fields in different switches 103 and 101. Switch 101 also includes a global VLAN mapping 178. An entry in mapping 178 maps an internal identifier to a corresponding global VLAN. Mapping 178 maps internal identifiers 182 and 184 to aggregate global VLANs 152 and 154, respectively.

Since switch 101 does not forward packets for tenants 1 and 2 via a local edge port to a tenant device, mapping 178 does not distinguish between individual tenant VLANs of a tenant. Since mappings 176 and 178 are smaller than mappings 172 and 174, respectively, mappings 176 and 178 need less hardware resources. Hence, and network extension group 150 provides scalability in network 100 and allows aggregate switch 101 to support multiple edge switches 103, 104, and 105. In some embodiments, internal identifiers 182 and 184 in switch 101 are mapped to a corresponding egress port. If the header information of an ingress packet matches an internal identifier, switch 101 forwards that packet via the corresponding egress port.

Network Extension

Figure 2A:
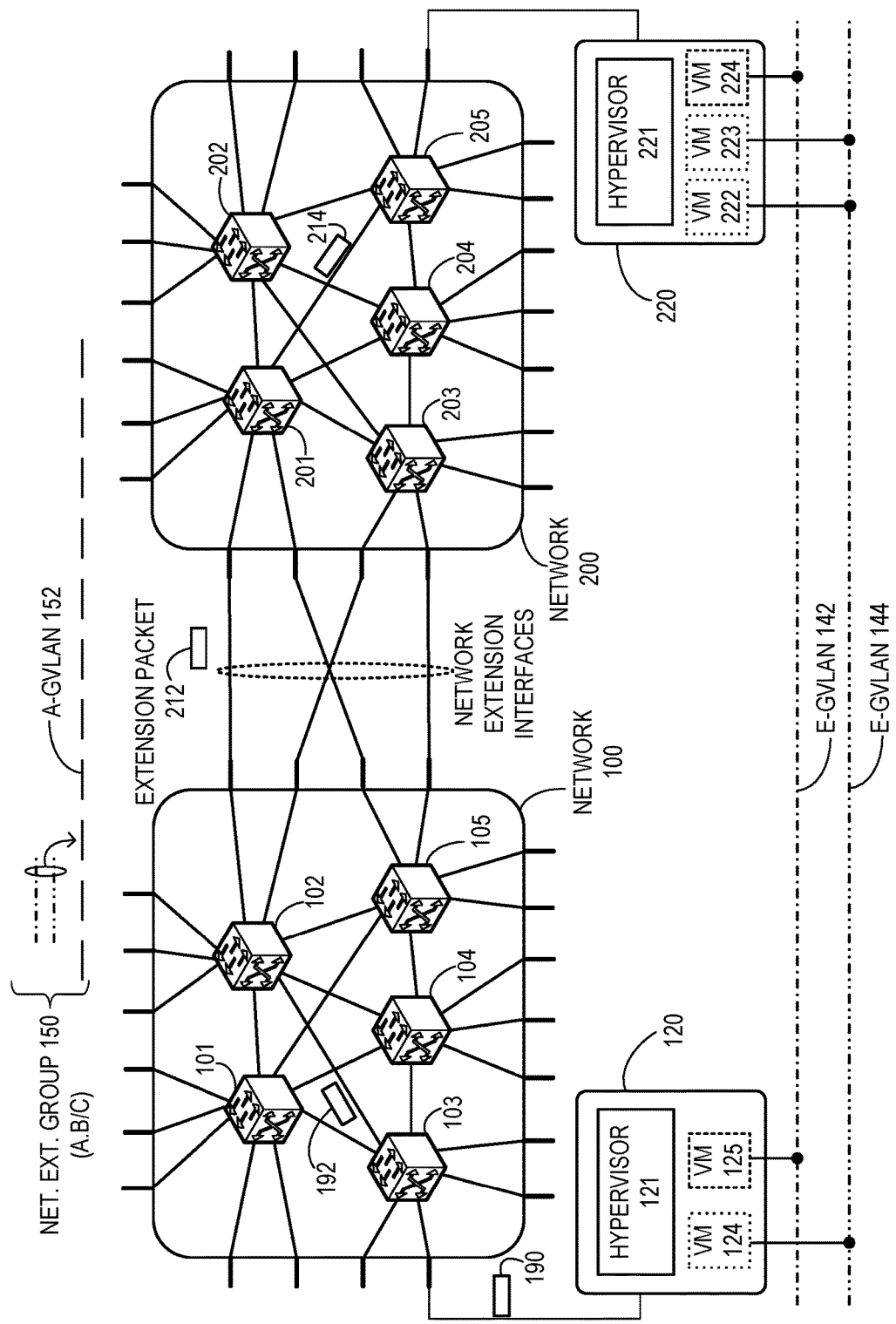
FIG. 2A illustrates an exemplary network extension based on network extension groups, in accordance with an embodiment of the present invention.

In some embodiments, network extension group 150 can be persistent in multiple networks. FIG. 2A illustrates an exemplary network extension based on network extension groups, in accordance with an embodiment of the present invention. In this example, network 100 is coupled to network 200, which includes member switches 201, 202, 203, 204, and 205. Network 200 can be a TRILL network and a respective member switch, such as switch 205, can be a TRILL RBridge. Network 200 can also be an IP network and a respective member switch, such as switch 205, can be an IP-capable switch, which calculates and maintains a local IP routing table (e.g., a routing information base or RIB), and is capable of forwarding packets based on its IP addresses. In some embodiments, network 200 is a fabric switch, and one or more switches in fabric switch 200 can be virtual switches (e.g., a software switch running on a computing device).

In network 200, switches 203, 204, and 205 can operate as edge switches, and switches 201 and 202 can operate as aggregate switches. Switch 205 is coupled to host machine 220. Member switches in network 200 use edge ports to communicate with end devices and inter-switch ports to communicate with other member switches. For example, switch 205 is coupled to end devices, such as host machine 220, via edge ports and to switches 201, 202, and 204 via inter-switch ports. Host machine 220 includes hypervisors 221. Virtual machines 222, 223, and 224 run on hypervisor 221 and belong to tenant 1. Virtual machine 224 is in VLAN 112 of tenant 1, and virtual machines 222 and 223 are in VLAN 114 of tenant 1.

Suppose that packet 190 is destined to virtual machine 224 in host machine 220 coupled to network 200. With existing technologies, when transport packet 192, which includes packet 190 in its payload, reaches aggregate switch 102, switch 102 removes the encapsulation header, extracts packet 190, and forwards packet 190 to network 200 (e.g., either to switch 201 or 203). As a result, packet 190 can only carry the VLAN identifier (e.g., 12 bits in an IEEE 802.1Q tag) of tenant VLAN 112. Hence, the total number of VLANs a port of switch 102 coupling network 200 can support for tenant 1 is limited by the number of bits dedicated for the VLAN identifier. Furthermore, additional VLAN identifiers (e.g., an IEEE 802.1ad tags or TRILL FGLs) for representing tenant 1 can be different in networks 100 and 200. This leads to additional VLAN configuration in the member switches of network 200.

To solve this problem, interconnections between networks 100 and 200 are established via network extension interfaces (NEIs). A packet sent via a network extension interface includes an aggregate global VLAN identifier. Examples of a network extension interface include, but are not limited to, a physical or virtual port, a set of trunked port (e.g., a port channel interface), and a tunnel interface (e.g., a VXLAN or NVGRE tunnel interface). Furthermore, network extension group 150 can be persistent across network 100 and 200. As a result, the same range of global VLAN identifiers represented by A.B/C is used in network 200.

In some embodiments, a MAC address learned in network 200 is shared with network 100. Suppose that switch 205 learns the MAC address of virtual machine 224 (e.g., via MAC address learning or pre-configuration). Switch 205 generates a notification message, includes the learned MAC address in the payload of the notification message, and sends the notification message to a respective other member switch of network 200. Upon receiving the notification message, switch 201 learns the MAC address of virtual machine 224. Switch 201 also determines that it has network extension interfaces coupling network 100.

Switch 201 then sends an extension notification message comprising the learned MAC address via its local network extension interfaces. Upon receiving the extension notification message, switch 102 (or 105) learns the MAC address to be reachable via its local network extension interface. Switch 102 can map the learned MAC address to the network extension interface. Switch 102 then includes the learned MAC address in the payload of a notification message and sends the notification message to a respective other switch of network 100. A respective switch of network 100 thus learns the MAC address to be reachable via switch 102.

In this example, switch 102 can include the VLAN identifier of aggregate global VLAN 152 in the header of packet 190 to generate an extension packet 212. A packet sent via a network extension interface can be referred to as an extension packet. Switch 102 then forwards packet 212 to network 200. Suppose that switch 201 receives packet 212. Upon detecting the VLAN identifier of aggregate global VLAN 152 in its header, switch 201 determines that packet 212 belongs to network extension group 152. Switch 201 then extracts the VLAN identifier to obtain packet 190. Switch 201 encapsulates packet 190 in an encapsulation header to generate transport packet 214, includes the VLAN identifier of aggregate global VLAN 152 in the encapsulation header, and forwards packet 214 to switch 205. In this way, persistent network extension group 150 allows interconnectivity between networks 100 and 200 using network extension interfaces at the interconnection. This increases the number of VLANs tenant 1 may have in networks 100 and 200.

Figure 2B:
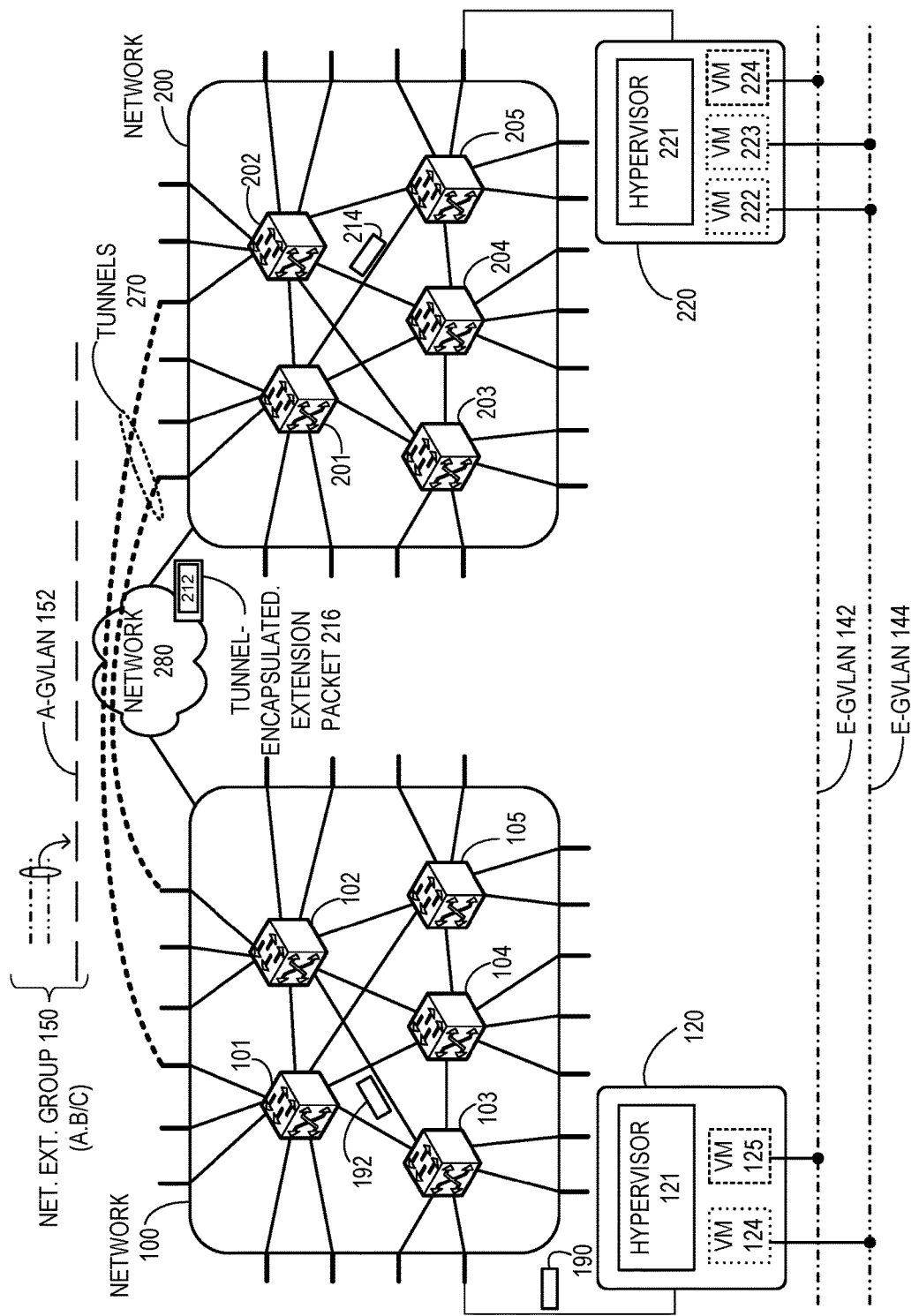
FIG. 2B illustrates an exemplary tunnel-based network extension based on network extension groups, in accordance with an embodiment of the present invention.

In some embodiments, a network extension interface can be a tunnel interface. FIG. 2B illustrates an exemplary tunnel-based network extension based on network extension groups, in accordance with an embodiment of the present invention. In this example, networks 100 and 200 are coupled via a layer-3 network 280. Hence, the network extension interfaces of networks 100 and 200 are tunnel interfaces (e.g., a VXLAN or NVGRE tunnel interface). One or more aggregate switches of network 100 establish corresponding tunnels 270 with one or more aggregate switches of network 200 via network 280. Network extension group 150 can be persistent across network 100 and 200. As a result, the same range of global VLAN identifiers represented by A.B/C is used in network 200.

Upon generating extension packet 212, which includes VLAN identifier of aggregate global VLAN 152, switch 102 encapsulates packet 212 in a tunnel encapsulation header (e.g., a VXLAN or NVGRE header) to generate tunnel-encapsulated extension packet 216. Suppose that switch 201 of network 200 is the remote tunnel endpoint of the tunnel. Switch 102 sets the switch identifier (e.g., an IP address) of switch 201 as the destination switch identifier of the tunnel encapsulation header, identifies the local port associated with the tunnel interface, and forwards packet 216 via the port. Switch 201 receives packet 216, identifies the local switch as the destination switch, and decapsulates the tunnel encapsulation header to obtain packet 212. Switch 201 then extracts the VLAN identifier of aggregate global VLAN 152 from packet 212 to obtain packet 190 and forwards packet 190 based on its header, as described in conjunction with FIG. 2A.

In some embodiments, aggregate global VLAN 152 of network extension group 150 can support Internet Protocol (IP) routing and can be associated with an IP subnet. Aggregate global VLAN 152 operates as a logical layer-3 interface assigned with an IP address, which can be a virtual IP address, from the subnet in aggregate switches 101 and 102. Switches 101 and 102 can maintain a mapping between aggregate global VLAN 152 and the corresponding subnet. In some embodiments, the layer-3 interface operates as a default gateway for a respective global VLAN of network extension group 150. Because the layer-3 interface is associated with the same virtual IP address in switches 101 and 102, the layer-3 interface operates as a distributed layer-3 gateway, and can operate as the tunnel endpoint address for the tunnels between networks 100 and 200.

Hierarchical Network Extension

Figure 2C:
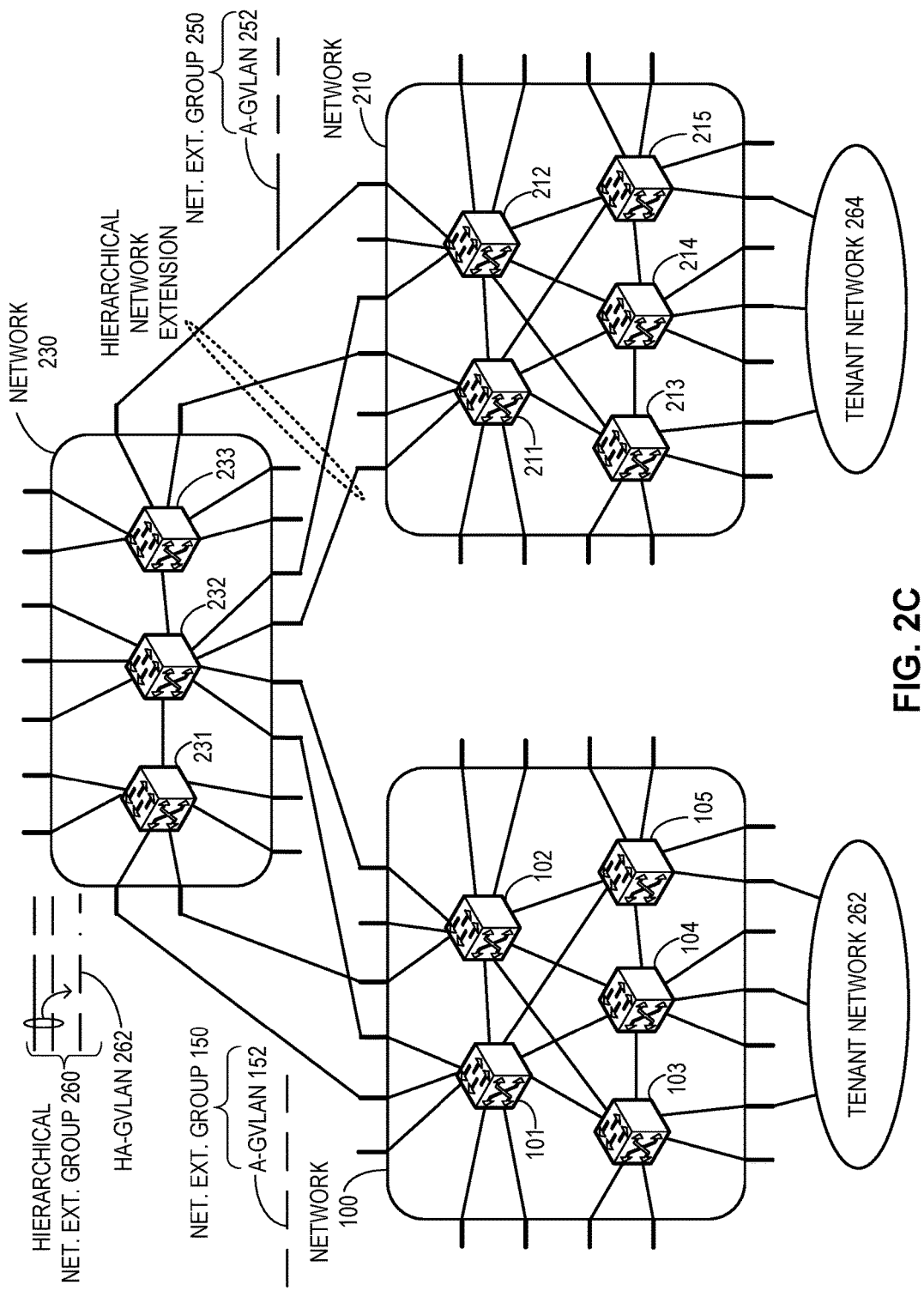
FIG. 2C illustrates an exemplary hierarchical network extension based on network extension groups, in accordance with an embodiment of the present invention.

Since a persistent network extension group allows interconnectivity between networks based on network extension interfaces, a provider can deploy multiple smaller networks to form a large hierarchical network. FIG. 2C illustrates an exemplary hierarchical network extension based on network extension groups, in accordance with an embodiment of the present invention. In this example, network 210 includes member switches 211, 212, 213, 214, and 215; and network 230 can include member switches 231, 232, and 233.

Network 210 and/or 230 can be a TRILL network and a respective member switch can be a TRILL RBridge. Network 210 and/or 230 can also be an IP network and a respective member switch can be an IP-capable switch, which calculates and maintains a local IP routing table (e.g., a routing information base or RIB), and is capable of forwarding packets based on its IP addresses. In some embodiments, network 210 and/or 230 are fabric switches, and one or more member switches can be virtual switches (e.g., a software switch running on a computing device). Member switches in network 210 and/or 230 use edge ports to communicate with end devices and inter-switch ports to communicate with other member switches.

Networks 100 and 210 are coupled to network 230. Suppose that two tenant networks 262 and 264, which can belong to the same or different tenants, are coupled to networks 100 and 210, respectively. A tenant network can include one or more host machines, each of which can host one or more virtual machines. For example, tenant network 262 can belong to tenant 1. Network extension groups 150 and 250 are configured for tenant networks 262 and 264, respectively, in networks 100 and 210, respectively. Network extension groups 150 and 250 include aggregate global VLANs 152 and 252, respectively.

In network 210, switches 213, 214, and 215 can operate as edge switches, and switches 211 and 212 can operate as aggregate switches. Hence, switches 211 and 212 include the VLAN identifier of aggregate VLAN 252 in extension packets which carries packets from tenant network 264. Since network 230 couple networks 100 and 210, member switches 231, 232, and 233 can operate as aggregate switches for the aggregate switches of networks 100 and 210. For example, aggregate global VLANs 152 and 252 can be further aggregated in network 230. A hierarchical network extension group 260 can be configured in network 230. Hierarchical network extension group 260 include aggregate global VLANs 152 and 252, and a hierarchical aggregate global VLAN 262.

Aggregate switches in network 100 or 210 forward packets from tenant network 262 or 264, respectively, to network 230 via hierarchical network extensions. In some embodiments, network extension interfaces of networks 100, 210, and 230 form the hierarchical network extensions. Upon identifying aggregate global VLAN 152 or 252 in an extension packet, a member switch in network 230 associates the packet with hierarchical network extension group 260, and use the VLAN identifier of hierarchical aggregate global VLAN 262 for any further communication. This allows a provider to deploy multiple smaller networks 100, 210, and 230 to form a large hierarchical network, thereby facilitating isolation of network management and fault detection within networks 100, 200, and 230.

Initialization and Operations

Figure 3:
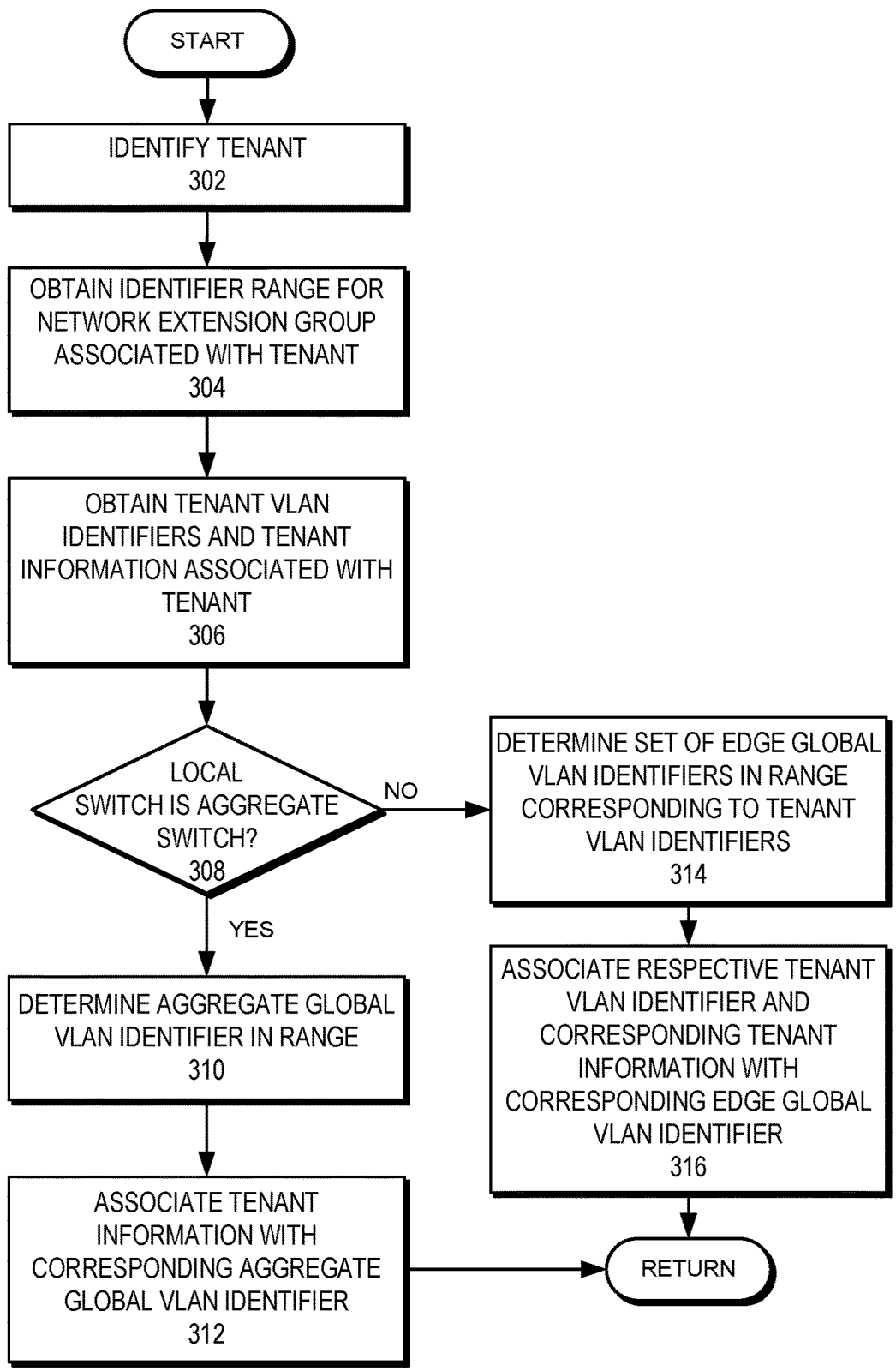
FIG. 3 presents a flowchart illustrating the process of a switch initializing a network extension group, in accordance with an embodiment of the present invention.

In the example in FIG. 1A, a respective member switch in network 100 initializes network extension groups 150 and 155. FIG. 3 presents a flowchart illustrating the process of a switch initializing a network extension group, in accordance with an embodiment of the present invention. During operation, the switch identifies a tenant (operation 302) and obtains an identifier range for a network extension group associated with the tenant (operation 304). The switch then obtains tenant VLAN identifiers and tenant information associated with the tenant (operation 306). Tenant information includes one or more of: MAC addresses of tenant devices, port identifiers of ports coupling tenant devices, and IP subnets of the tenant. The switch then checks whether the local switch is an aggregate switch for the tenant (operation 308).

If the local switch is an aggregate switch, the switch determines an aggregate global VLAN identifier in the range (operation 310) and associates the tenant information with the corresponding aggregate global VLAN identifier (operation 312). In some embodiments, the association is based on internal identifiers of the switch, as described in conjunction with FIG. 1C. This association can be configured by a network administrator as well. If the local switch is not an aggregate switch, the switch determines a set of edge global VLAN identifiers in the range corresponding to the tenant VLAN identifiers (operation 314). The switch then associates a respective tenant VLAN identifier and corresponding tenant information with the corresponding edge global VLAN identifier (operation 316).

Figure 4A:
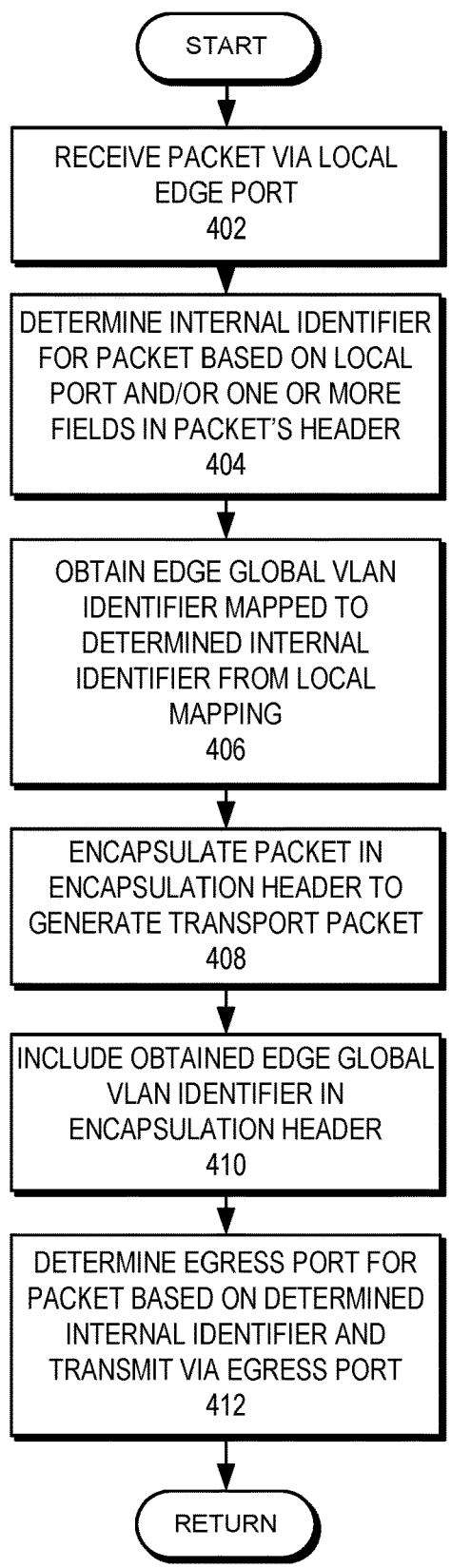
FIG. 4A presents a flowchart illustrating the process of an edge switch forwarding a packet based on a network extension group, in accordance with an embodiment of the present invention.

FIG. 4A presents a flowchart illustrating the process of an edge switch forwarding a packet based on a network extension group, in accordance with an embodiment of the present invention. During operation, the switch receives a packet via a local edge port (operation 402) and determines an internal identifier for the packet based on the local port (e.g., a port identifier) and/or one or more fields in the packet's header (operation 404). The switch obtains an edge global VLAN identifier mapped to the determined internal identifier from the local mapping (operation 406). The switch encapsulates the packet in an encapsulation header to generate a transport packet (operation 408) and includes the obtained edge global VLAN identifier in the encapsulation header (operation 410), as described in conjunction with FIG. 1A. The switch then determines an egress port for the packet based on the determined internal identifier and transmits the packet via the port (operation 412). If the packet is a multi-destination packet, a plurality of egress ports can be mapped to the internal identifier.

Figure 4B:
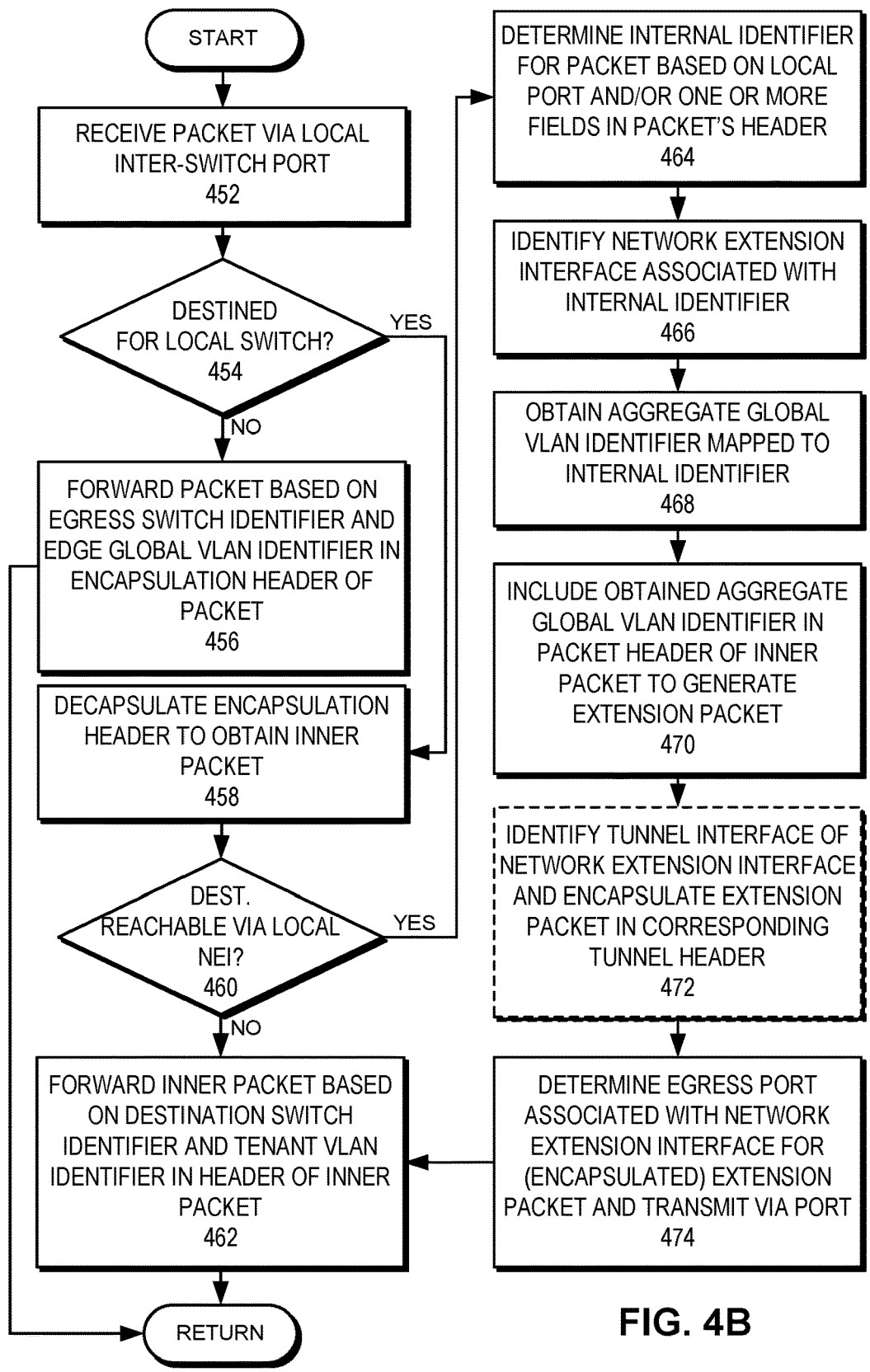
FIG. 4B presents a flowchart illustrating the process of an aggregate switch forwarding a packet based on a network extension group, in accordance with an embodiment of the present invention.

FIG. 4B presents a flowchart illustrating the process of an aggregate switch forwarding a packet based on a network extension group, in accordance with an embodiment of the present invention. During operation, the switch receives a packet via a local inter-switch port (operation 452) and checks whether the packet is destined for the local switch (operation 454). If the packet is not destined for the local switch, the switch forwards the packet based on the egress switch identifier and edge global VLAN identifier in the encapsulation header of the packet (operation 456). If the packet is destined for the local switch, the switch decapsulates the encapsulation header to obtain the inner packet (e.g., an Ethernet frame) (operation 454). This inner packet can be a tenant packet.

The switch then checks whether the destination address of the inner packet (e.g., a destination MAC address) is reachable via a local network extension interface (operation 460). If the destination of the inner packet is not reachable via a local network extension interface, the packet is for a device coupled via a local edge port. The switch then forwards the inner packet based on the destination switch identifier (e.g., the destination MAC address) and a tenant VLAN identifier in the header of the inner packet (operation 462). If the destination of the inner packet is reachable via a local network extension interface, the switch determines an internal identifier for the packet based on the local port (e.g., a port identifier) and one or more fields in the packet's header (operation 464).

The switch identifies a network extension interface associated with the internal identifier (operation 466) and obtains an aggregate global VLAN identifier mapped to the internal identifier (operation 468). The switch includes the obtained aggregate global VLAN identifier in the packet header of the inner packet to generate an extension packet (operation 470), as described in conjunction with FIG. 2A. If the network extension interface is a tunnel interface, the switch identifies the tunnel interface of the network extension interface and encapsulates the extension packet in a corresponding tunnel header (operation 472). The switch determines an egress port associated with the network extension interface for the (encapsulated) extension packet and transmits the packet via the port (operation 474).

Exemplary Switch

Figure 5:
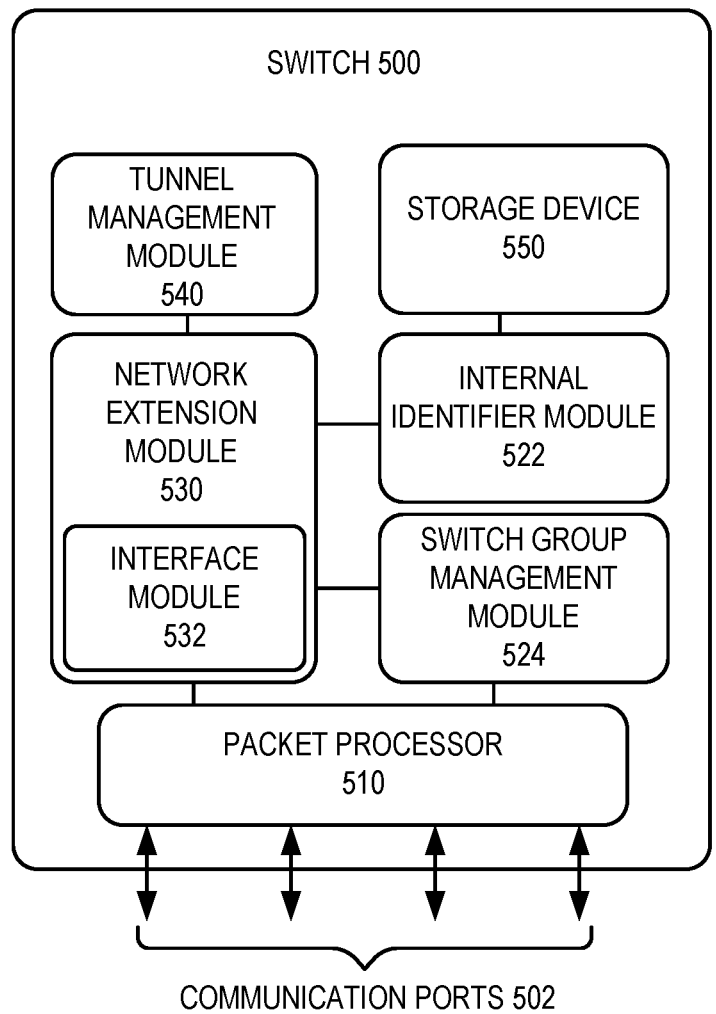
FIG. 5 illustrates an exemplary switch with support for network extension groups, in accordance with an embodiment of the present invention.

FIG. 5 illustrates an exemplary switch with network extension group support, in accordance with an embodiment of the present invention. In this example, a switch 500 includes a number of communication ports 502, a packet processor 510, a network extension module 530, and a storage device 550. In some embodiments, packet processor 510 adds an encapsulation header to a packet. In some embodiments, switch 500 includes a switch group management module 524, which maintains a membership in a network of interconnected switches. A respective switch of the network is associated with a group identifier identifying the switch group In some embodiments, the network group is a fabric switch. Switch 500 maintains a configuration database in storage 550 that maintains the configuration state of a respective switch within the fabric switch. Switch 500 maintains the state of the fabric switch, which is used to join other switches. Under such a scenario, communication ports 502 can include inter-switch communication channels for communication within a fabric switch. This inter-switch communication channel can be implemented via a regular communication port and based on any open or proprietary format (e.g., a TRILL or IP protocol).

Network extension module 530 maintains a mapping between a first VLAN identifier and a first global VLAN identifier of a network extension group. In some embodiments, the mapping maps the first VLAN identifier to an internal identifier, and maps the internal identifier to the first global VLAN identifier. Switch 500 can include an internal identifier module 522, which generates an internal identifier for a packet based on an ingress port and/or one or more fields of the packet. During operation, network extension module 530 includes the global VLAN identifier in a packet belonging to the first VLAN, as described in conjunction with FIGS. 1A and 2A. If switch 500 is an edge switch, the first global VLAN identifier is an edge global VLAN identifier of the network extension group.

On the other hand, if switch 500 is an aggregate switch, the first global VLAN identifier is an aggregate global VLAN identifier of the network extension group. Switch 500 can be an aggregate switch for one or more aggregate switches in remote networks, as described in conjunction with FIG. 2C. Switch 500 can also include an interface module 532, which maintains a network extension interface forwarding the packet comprising the first global VLAN identifier. In some embodiments, switch 500 includes a tunnel management module 540, which encapsulates the packet in a tunnel encapsulation header. The network extension interface is then a tunnel interface.

Note that the above-mentioned modules can be implemented in hardware as well as in software. In one embodiment, these modules can be embodied in computer-executable instructions stored in a memory which is coupled to one or more processors in switch 500. When executed, these instructions cause the processor(s) to perform the aforementioned functions.

In summary, embodiments of the present invention provide a switch and a method for providing a global VLAN across a plurality of networks. In one embodiment, the switch is in a network of interconnected switches. The switch includes a network extension module, which maintains a mapping between a first VLAN identifier and a first global VLAN identifier of a network extension group. The network extension group is represented by a range of global VLAN identifiers for a tenant. A global VLAN identifier is persistent in a respective switch of the network and represents a virtual forwarding domain in the network. During operation, the network extension module includes the global VLAN identifier in a packet belonging to the first VLAN.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   network extension circuitry configured to:
      maintain a mapping between a information associated with a tenant and an aggregate global virtual local area network (VLAN) identifier of a network extension group associated with the tenant, wherein the network extension group comprises a set of edge global VLAN identifiers for individual VLAN identifiers of the tenant and the aggregate global VLAN identifier corresponding to the tenant;
      include the aggregate global VLAN identifier in a packet belonging to the tenant based on the mapping; and
   forwarding circuitry configured to determine an egress port for the packet based on a destination switch identifier of the packet and the aggregate global VLAN identifier;
   wherein a respective global VLAN identifier is persistent in a respective switch of a first network of interconnected switches, wherein the first network of interconnected switches is identified by a first fabric identifier.

2. The switch of claim 1, wherein the switch is an aggregate switch for one or more edge switches in the first network of interconnected switches.

3. The switch of claim 1, wherein the egress port is associated with a network extension interface, wherein a second network of interconnected switches is reachable via the network extension interface and identified by a second fabric identifier.

4. The switch of claim 3, further comprising tunnel management circuitry configured to encapsulate the packet in a tunnel encapsulation header, wherein the network extension interface is a tunnel interface for a tunnel between the first and second networks of interconnected switches.

5. The switch of claim 3, wherein the network extension group is persistent in the second network of interconnected switches and represents a virtual forwarding domain in the second network of interconnected switches.

6. The switch of claim 3, wherein the network extension circuitry is further configured to identify a media access control (MAC) address from a payload of a notification message, wherein the MAC address is learned at a switch in the second network of interconnected switches.

7. The switch of claim 1, wherein the switch is an aggregate switch for one or more aggregate switches in a remote network of interconnected switches, wherein the aggregate global VLAN identifier corresponds to a plurality of global VLANs of the remote network of interconnected switches.

8. The switch of claim 1, further comprising a packet processor configured to decapsulate an encapsulation header of a second packet, wherein the encapsulation header includes an edge global VLAN identifier in the network extension group.

9. The switch of claim 1, wherein a respective switch of the first network of interconnected switches is associated with the first fabric identifier.

10. The switch of claim 1, wherein the mapping maps the information of the tenant to an internal identifier, and maps the internal identifier to the aggregate global VLAN identifier; and
    wherein the internal identifier is internal and local to the switch, and is distinct from a VLAN identifier.

11. A method, comprising:
    maintaining, by a switch, a mapping between a information associated with a tenant and an aggregate global virtual local area network (VLAN) identifier of a network extension group associated with the tenant, wherein the network extension group comprises a set of edge global VLAN identifiers for individual VLAN identifiers of the tenant and the aggregate global VLAN identifier corresponding to the tenant;
    including the aggregate global VLAN identifier in a packet belonging to the tenant based on the mapping; and
    determining an egress port for the packet based on a destination switch identifier of the packet and the aggregate global VLAN identifier;
    wherein a respective global VLAN identifier is persistent in a respective switch of a first network of interconnected switches, wherein the first network of interconnected switches is identified by a first fabric identifier.

12. The method of claim 11, wherein the switch is an aggregate switch for one or more edge switches in the first network of interconnected switches.

13. The method of claim 11, wherein the egress port is associated with a network extension interface, wherein a second network of interconnected switches is reachable via the network extension interface and identified by a second fabric identifier.

14. The method of claim 13, further comprising encapsulating the packet in a tunnel encapsulation header, wherein the network extension interface is a tunnel interface for a tunnel between the first and second networks of interconnected switches.

15. The method of claim 13, wherein the network extension group is persistent in the second network of interconnected switches and represents a virtual forwarding domain in the second network of interconnected switches.

16. The method of claim 13, further comprising identifying a media access control (MAC) address from a payload of a notification message, wherein the MAC address is learned at a switch in the second network of interconnected switches.

17. The method of claim 11, wherein the switch is an aggregate switch for one or more aggregate switches in a remote network of interconnected switches, wherein the aggregate global VLAN identifier corresponds to a plurality of global VLANs of the remote network of interconnected switches.

18. The method of claim 11, further comprising decapsulating an encapsulation header of a second packet, wherein the encapsulation header includes an edge global VLAN identifier in the network extension group.

19. The method of claim 11, wherein a respective switch of the first network of interconnected switches is associated with the first fabric identifier.

20. The method of claim 11, wherein the mapping maps the information of the tenant to an internal identifier, and maps the internal identifier to the aggregate global VLAN identifier; and
    wherein the internal identifier is internal and local to the switch, and is distinct from a VLAN identifier.

* * * * *